US008109724B2

(12) United States Patent
Malecki et al.

(10) Patent No.: US 8,109,724 B2
(45) Date of Patent: Feb. 7, 2012

(54) RECESSED METERING STANDOFFS FOR AIRFOIL BAFFLE

(75) Inventors: Stacy T. Malecki, Storrs, CT (US); Tracy A. Propheter-Hinckley, Manchester, CT (US); Amanda Jean Learned, Manchester, CT (US); Shawn J. Gregg, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 434 days.

(21) Appl. No.: 12/411,851

(22) Filed: Mar. 26, 2009

(65) Prior Publication Data

US 2010/0247327 A1 Sep. 30, 2010

(51) Int. Cl.
*B64C 11/24* (2006.01)

(52) U.S. Cl. ...... 416/90 R; 416/95; 416/96 A; 416/97 A

(58) Field of Classification Search ................ 416/96 A, 416/95, 90 R, 97 A
See application file for complete search history.

(56) References Cited

U.S. PATENT DOCUMENTS 3,301,527 A 1/1967 Kercher
3,628,880 A 12/1971 Smuland et al.
3,809,494 A 5/1974 Redman
3,994,622 A 11/1976 Schultz et al.
4,105,364 A 8/1978 Dodd
4,153,386 A * 5/1979 Leogrande et al. ........... 415/115
4,482,295 A 11/1984 North et al.
4,887,663 A 12/1989 Auxier et al.
5,083,422 A 1/1992 Vogt
5,193,975 A * 3/1993 Bird et al. ..................... 415/115
5,203,873 A 4/1993 Corsmeier et al.
5,259,730 A 11/1993 Damlis et al.
5,383,766 A 1/1995 Przirembel et al.
5,392,515 A 2/1995 Auxier et al.
5,415,225 A 5/1995 Randlett et al.
5,419,039 A 5/1995 Auxier et al.
5,779,438 A 7/1998 Wilfert (Continued)

FOREIGN PATENT DOCUMENTS

EP 0416542 A1 3/1991

(Continued)

OTHER PUBLICATIONS

Official Search Report and Written Opinion of the in counterpart foreign Application No. 10250615, filed Mar. 26, 2009.

(Continued)

*Primary Examiner* — Wai Sing Louie
(74) *Attorney, Agent, or Firm* — Kinney & Lange, P.A.

(57) ABSTRACT

An internally cooled airfoil comprises an airfoil body, a baffle and a plurality of standoffs. The airfoil body is shaped to form leading and trailing edges, and pressure and suction sides surrounding an internal cooling channel. The baffle is disposed within the internal cooling channel and comprises a liner body having a perimeter shaped to correspond to the shape of the internal cooling channel and to form a cooling air supply duct. The baffle includes a plurality of cooling holes extending through the liner body to direct cooling air from the supply duct into the internal cooling channel. The standoffs maintain minimum spacing between the liner body and the airfoil body. In one embodiment, the standoffs are recessed into a surface of either the baffle or the airfoil body. In another embodiment, the standoffs are elongated to meter flow between the liner body and the airfoil body.

37 Claims, 9 Drawing Sheets

U.S. PATENT DOCUMENTS

| | | | |
|---|---|---|---|
| 6,142,734 | A | 11/2000 | Lee |
| 6,237,344 | B1 | 5/2001 | Lee |
| 6,582,186 | B2 | 6/2003 | Manzoori et al. |
| 6,984,102 | B2 | 1/2006 | Bunker et al. |
| RE39,479 | E | 1/2007 | Tressler et al. |
| 7,258,528 | B2 * | 8/2007 | Trindade et al. ............ 416/96 A |
| 2005/0031452 | A1 | 2/2005 | Liang |
| 2005/0150632 | A1 | 7/2005 | Mayer et al. |
| 2008/0019840 | A1 | 1/2008 | Cunha |
| 2009/0010765 | A1 | 1/2009 | Propheter-Hinckley et al. |

FOREIGN PATENT DOCUMENTS

| | | | |
|---|---|---|---|
| EP | 1059418 | A2 | 12/2000 |
| EP | 1188902 | A1 | 3/2002 |
| EP | 2011970 | A2 | 1/2009 |
| GB | 2097479 | A | 11/1982 |

OTHER PUBLICATIONS

Official Search Report and Written Opinion of the in counterpart foreign Application No. 10250616, filed Mar. 26, 2010.

* cited by examiner

RECESSED METERING STANDOFFS FOR AIRFOIL BAFFLE

BACKGROUND

The present invention is related to cooling of airfoils for gas turbine engines and, more particularly, to baffle inserts for impingement cooling of airfoil vanes. Gas turbine engines operate by passing a volume of high energy gases through a series of compressors and turbines in order to produce rotational shaft power. The shaft power is used to turn a turbine for driving a compressor to provide air to a combustion process to generate the high energy gases. Additionally, the shaft power is used to power a secondary turbine to, for example, drive a generator for producing electricity, or to produce high momentum gases for producing thrust. Each compressor and turbine comprises a plurality of stages of vanes and blades, each having an airfoil, with the rotating blades pushing air past the stationary vanes. In general, stators redirect the trajectory of the air coming off the rotors for flow into the next stage. In the compressor, stators convert kinetic energy of moving air into pressure, while, in the turbine, stators accelerate pressurized air to extract kinetic energy.

In order to produce gases having sufficient energy to drive both the compressor and the secondary turbine, it is necessary to compress the air to elevated temperatures and to combust the air, which again increases the temperature. Thus, the vanes and blades are subjected to extremely high temperatures, often times exceeding the melting point of the alloys used to make the airfoils. In particular, the leading edge of an airfoil, which impinges most directly with the heated gases, is heated to the highest temperature along the airfoil. The airfoils are maintained at temperatures below their melting point by, among other things, cooling the airfoils with a supply of relatively cooler air that is typically siphoned from the compressor. The cooling air is directed into the blade or vane to provide cooling of the airfoil through various modes including impingement cooling. Specifically, the cooling air is passed into an interior of the airfoil to remove heat from the alloy. The cooling air is subsequently discharged through cooling holes in the airfoil to pass over the outer surface of the airfoil to prevent the hot gases from contacting the vane or blade. In other configurations, the cooling air is typically directed into a baffle disposed within a vane interior and having a plurality cooling holes. Cooling air from the cooling holes impinges on and flows against an interior surface of the vane before exiting the vane at a trailing edge discharge slot.

The cooling air effectiveness is determined by the distance between the baffle and the airfoil. A greater amount of cooling is provided by increasing the distance to allow a greater volume of airflow. The distance between the baffle and the airfoil is conventionally maintained by a plurality of standoffs that inhibit the baffle from moving and control flow volume. Sometimes only a small volume of airflow is desirable such that the height of the standoffs is difficult or impossible to produce. For example, casting of features onto a surface of an airfoil requires that the feature have a height of about 0.010 inches (~0.254 mm) or more such that the feature can be reliably measured. Furthermore, machining of features within a cast airfoil is not possible. However, manufacturing tolerances sometimes require that the height be as small as about 0.009 inches (~0.229 mm) to about 0.005 inches (~0.127 mm) so that the baffle will fit into the airfoil. These manufacturing restrictions limit the ability to control the airflow, reducing the flexibility with which airfoil durability can be designed. There is, therefore, a need for improving control of airflow between a baffle and an airfoil, particularly when it is desirable to maintain such bodies in close proximity.

SUMMARY

The present invention is directed to an internally cooled airfoil for use in gas turbine engines. The airfoil comprises an airfoil body, a baffle and a plurality of standoffs. The airfoil body is shaped to form leading and trailing edges, and pressure and suction sides surrounding an internal cooling channel. The baffle is disposed within the internal cooling channel and comprises a liner body having a perimeter shaped to correspond to the shape of the internal cooling channel and to form a cooling air supply duct. The baffle includes a plurality of cooling holes extending through the liner body to direct cooling air from the supply duct into the internal cooling channel. The standoffs maintain minimum spacing between the liner body and the airfoil body. In one embodiment, the standoffs are recessed into a surface of either the baffle or the airfoil body such that a height of the standoffs is greater than the spacing. In another embodiment, the standoffs are elongated to meter flow between the liner body and the airfoil body.

DETAILED DESCRIPTION

Figure 1:
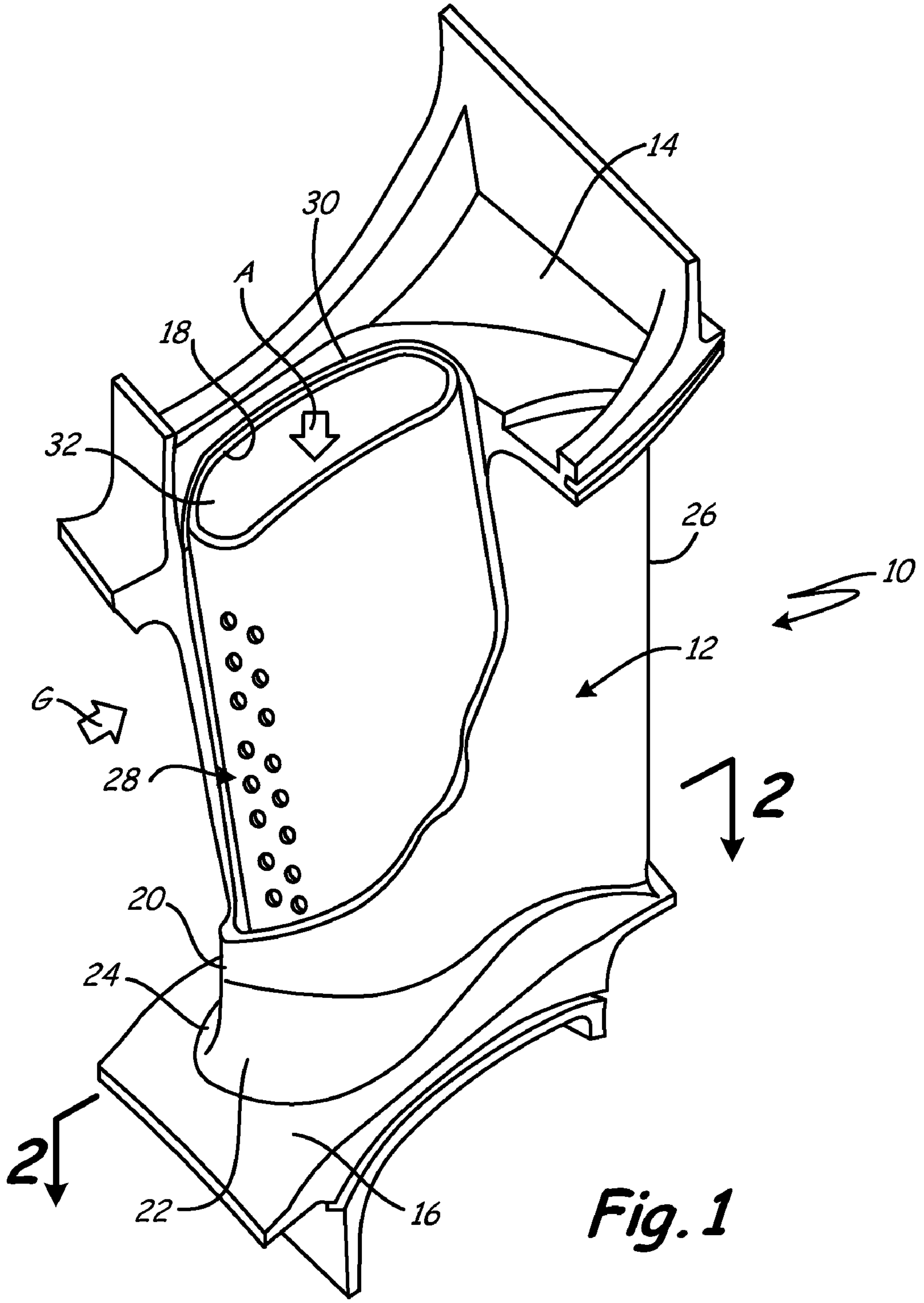
FIG. 1 is a perspective view of a stationary turbine vane in which an airfoil is cut away to show a cooling baffle.

FIG. 1 is a perspective view of stationary turbine vane 10 having airfoil 12, outer diameter vane shroud 14, inner diameter vane shroud 16 and baffle 18. Airfoil 12 includes leading edge 20, pressure side 22, suction side 24 and trailing edge 26. Baffle 18 includes cooling holes 28.

Turbine vane 10 is a stationary vane that receives high energy gas G and cooling air A in a turbine section of a gas turbine engine. In other embodiments, vane 10 is used in a compressor section of a gas turbine engine. Airfoil 12 comprises a thin-walled hollow structure that forms internal cavity 30 for receiving baffle 18 between shrouds 14 and 16. Baffle 18 comprises a hollow, sheet metal structure that forms cooling air supply duct 32. The outer diameter end of airfoil 12 mates with shroud 14 and the inner diameter end of airfoil 12 mates with shroud 16. In the embodiment shown, outer diameter shroud 14 includes an opening to receive baffle 18, while inner diameter shroud 16 is closed to support baffle 18. Baffle 18 is typically joined, such as by welding, to either outer diameter shroud 14 or inner diameter shroud 16, while remaining free at the opposite end. Shrouds 14 and 16 are connected to adjacent shrouds within the gas turbine engine to form structures between which airfoil 12 is supported. Outer diameter shrouds 14 are connected using, for example, threaded fasteners and suspended from an outer diameter engine case. Inner diameter shrouds 16 are similarly connected and supported by inner diameter support struts. Turbine vanes 10 operate to increase the efficiency of the gas turbine engine in which they are installed.

Vane shroud 14 and vane shroud 16 increase the efficiency of the gas turbine engine by forming outer and inner boundaries for the flow of gas G through the gas turbine engine. Vane shrouds 14 and 16 prevent escape of gas G from the gas turbine engine such that more air is available for performing work. The shape of vane 10 also increases the efficiency of the gas turbine engine. Vane 10 generally functions to redirect the trajectory of gas G coming from a combustor section or a blade of an upstream turbine stage to a blade of a downstream turbine stage. Pressure side 22 and suction side 24 redirect the flow of gas G received at leading edge 20 such that, after passing by trailing edge 26, the incidence of gas G on the subsequent rotor blade stage is optimized. As such, more work can be extracted from the interaction of gas G with downstream blades.

The efficiency of the gas turbine engine is also improved by increasing the temperature to which vane 10 can be subjected. For example, vane 10 is often positioned immediately downstream of a combustor section of a gas turbine engine where the temperature of gas G is hottest. Airfoil 12 is, therefore, subjected to a concentrated, steady stream of hot combustion gas G during operation of the gas turbine engine. The extremely elevated temperatures of combustion gas G often exceed the melting point of the material forming vane 10. Airfoil 12 is therefore cooled using cooling air A provided by, for example, relatively cooler air bled from a compressor section within the gas turbine engine. Typically, one end of baffle 18 is open to receive cooling air A for cooling airfoil 12 from hot gas G, while the other end is closed to assist in forcing cooling air A out cooling holes 28. Cooling air A enters supply duct 32 of baffle 18, passes through cooling holes 28 and enters internal cavity 30 to perform impingement cooling on the interior of airfoil 12. Cooling holes 28 distribute cooling air A to perform impingement cooling on the interior of airfoil 12.

Cooling holes 28 are positioned to cool a specific hotspot along airfoil 12. In the embodiment shown, cooling holes 28 comprise columns of cooling holes that extend across the entire span of the leading edge of baffle 18 to cool leading edge 20 of airfoil 12. In other embodiments, however, cooling holes are positioned over the entirety of baffle 18 or at other specific locations to cool hotspots on airfoil 12. Hot gas G flows across vane 10, impinges leading edge 20 and flows across suction side 22 and pressure side 24 of airfoil 12. The flow dynamics of gas G produced by the geometry of airfoil 12 may result in a particular portion of airfoil 12 developing a hotspot where the temperature rises to levels above where the temperature is at other places along airfoil 12. For example, the specific design of airfoil 12 may lead to hotspots based on the manner with which pressure side 22 engages gas G to perform work. Also, as with the case of all airfoil designs, leading edge 20 of airfoil 12 is particularly susceptible to hotspots due to interaction with the hottest portions of the flow of gas G. Direct impingement of gas G on leading edge 20 also inhibits the formation of turbulent flow across airfoil 12 that provides a buffer against gas G. As such, it is desirable to deliver additional cooling air A to hotspots on airfoil 12. In order to maximize the efficiency with which cooling air A flows within internal cavity 30, a plurality of standoffs are provided between airfoil 12 and baffle 18, as are discussed in greater detail with respect to FIGS. 2-9.

Figure 2:
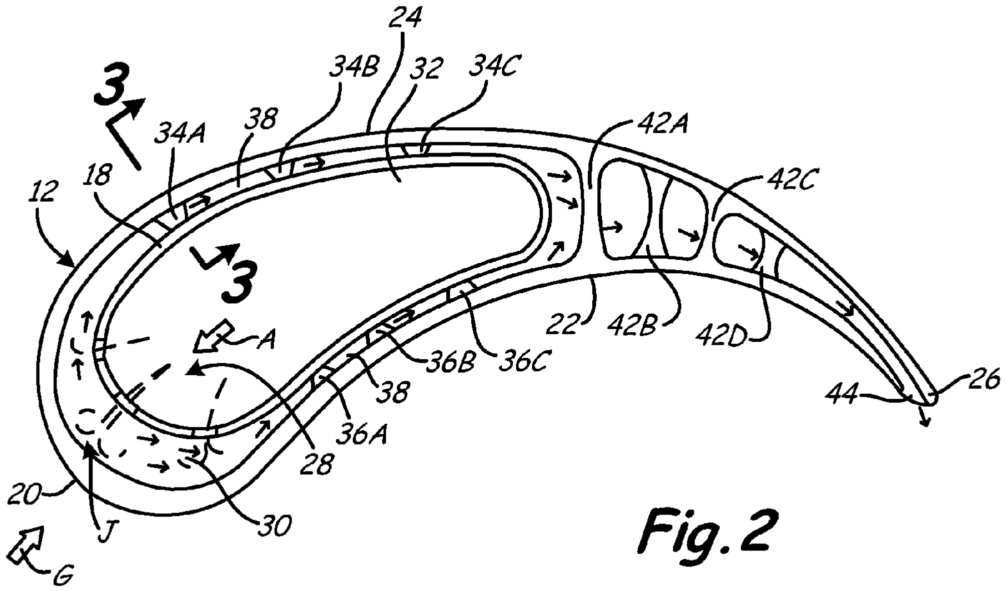
FIG. 2 is a cross-sectional view of the stationary turbine vane of FIG. 1 showing the baffle restrained within the airfoil using a plurality of standoffs of the present invention.

FIG. 2 is a cross-sectional view of stationary vane 10 of FIG. 1 taken at section 2-2 showing standoffs 34A-34C and standoffs 36A-36C positioned within cooling circuit 38 between baffle 18 and airfoil 12. Airfoil 12 includes leading edge 20, pressure side 22, suction side 24, trailing edge 26, pedestals 42A-42D and discharge slot 44. Baffle 18 includes leading edge cooling holes 28, which direct cooling air A through baffle 18 to form cooling jets J. Baffle 18 is inserted into internal cavity 30 and is maintained at a minimum distance from airfoil 12 by suction side standoffs 34A-34C and pressure side standoffs 36A-36C. Hot gas G, such as from a combustor of a gas turbine engine, impinges leading edge 20 of airfoil 12. Pressurized cooling air A, such as relatively cooler air from a compressor of the gas turbine engine, is directed into supply duct 32 of baffle 18.

Airfoil 12 is a thin-walled structure in the shape of an airfoil. The leading edge portions of pressure side 22 and suction side 24 are displaced from each other to form internal cavity 30. In the embodiment shown, internal cavity 30 comprises a single space, but in other embodiments cavity 30 may be divided into segments using integral partitions. Internal cavity 30 continually narrows as internal cavity 30 progresses from leading edge 20 toward trailing edge 26. Pressure side 22 and suction side 24 do not touch at trailing edge 26 such that discharge slot 44 is formed. The trailing edge portions of pressure side 22 and suction side 24 are supported with pedestals 42A-42D. Pedestals 42A-42D typically comprise small-diameter cylindrical stanchions that span the distance between pressure side 22 and suction side 24. Pedestals 42A-42D are staggered so as to form an anfractuous flow path between cavity 32 and discharge slot 44.

Baffle 18 is formed into the general shape of an airfoil so as to match the shape of internal cavity 30. For example, baffle 18 includes a leading edge profile that tracks with leading edge 20. In embodiments where cavity 30 is divided with partitions, a baffle can be provided to each segment of cavity 30. In such embodiments, the profile of baffle 18 may have other configurations, such as having a flat surface to track with a partition. Cooling holes can be positioned along any portion of baffle 18 to cool a plurality of unique hotspots. The perimeter of baffle 18 is continuous such that a simple hoop-shaped structure is formed. The walls of baffle 18 are shaped such that duct 32 comprises a single chamber. In the embodiment shown, the outer diameter end of baffle 18 is open such that cooling air A can be directed into duct 32 through shroud 14 (FIG. 1), while the inner diameter end of baffle 18 is closed to prevent escape of cooling air A from baffle 18.

Baffle 18 is disposed within airfoil 12 such that cooling circuit 38 is formed within cavity 30. Cavity 30 within airfoil 12 is open to duct 32 within baffle 18 through cooling holes 28. As such, a pressure differential is produced between cavity 30 and duct 32 when cooling air A is directed into baffle 18. Cooling air A is thus pushed through cooling holes 28 into cavity 32. Cooling holes 28 shape cooling air A into a plurality of small air jets J. Air jets J enter cooling circuit 38 whereby the air cools the interior surface of airfoil 12. Thus, both impingement cooling and conductive cooling is enhanced at leading edge 20 to remove heat from airfoil 12. From cavity 32, air jets J flow through standoffs 34A-34C and standoffs 36A-36C and around the outside of baffle 18 to perform additional conductive cooling on airfoil 12. Air jets J are then dispersed into pedestals 42A-42D. Air jets J flow above and below pedestals 42A-42D as they migrate toward discharge slot 44 where the air is released into hot gas G flowing around airfoil 12.

Standoffs 34A-34C and standoffs 36A-36C comprise small pads that extend across circuit 38 to inhibit movement of baffle 18 within cavity 36. Standoffs 34A-34C, among other things, prevent pressure from cooling air A from bulging or otherwise deforming baffle 18. Standoffs can be positioned around the entire perimeter of baffle 18, but are typically only provided along pressure side 22 and suction side 24. In the embodiment shown, the standoffs are shaped from airfoil 12, as is discussed further with reference to FIGS. 3A-6. In other embodiments, the standoffs are shaped from baffle 18, as is discussed with reference to FIGS. 7 & 8. For example, the standoffs can be integrally formed on the interior surface of airfoil 12 using an investment casting process. The standoffs can also be integrally formed into the exterior surface of baffle 18 using a die-shaping process. The standoffs are recessed into the surface from which they are produced to facilitate manufacture of standoffs having small heights. In another embodiment, the standoffs are elongated to meter volumetric flows of cooling air.

Figure 3A:
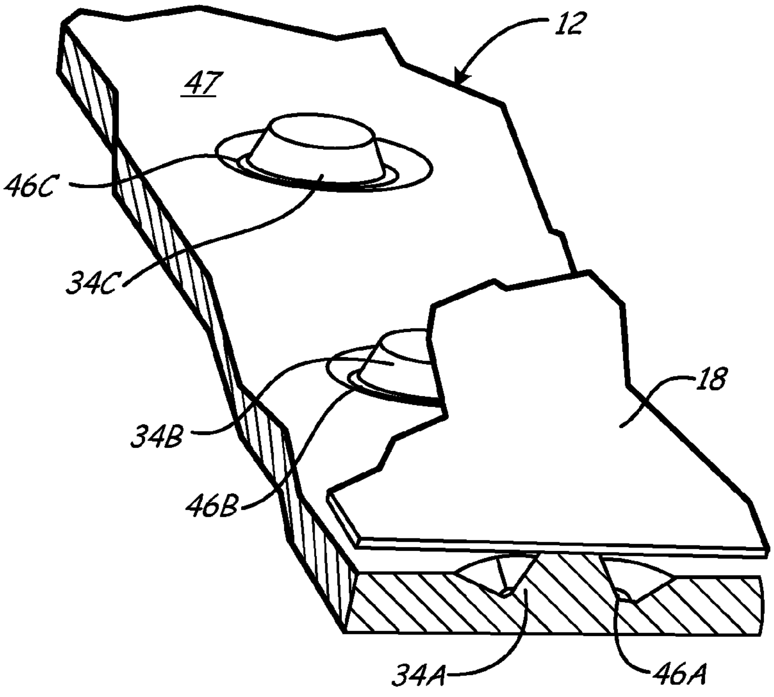
FIG. 3A is a perspective view of recessed standoffs used to restrain the cooling baffle within the airfoil of FIG. 1.

FIG. 3A is a perspective, cross-sectional view of airfoil 12 and baffle 18 taken at section 3-3 of FIG. 2. Baffle 18 is partially broken away to show standoffs 34A-34C and surrounding troughs 46A-46C. Standoffs 34A-34C form a portion of an array of standoffs, including standoffs 36A-36C of FIG. 2, that are integrally cast into interior surface 47 of airfoil 12 along the entire span of vane 10. In one embodiment, the standoffs are arranged in a plurality of columns to maintain baffle 18 spaced apart from airfoil 12. Furthermore, the standoffs are shaped to facilitate manufacture and to increase control of air flowing between baffle 18 and airfoil 12. Specifically, standoffs 34A-34C are recessed into interior surface 47 of airfoil 12 such that troughs 46A-46C are formed. Standoffs 34A-34C comprise generally oval shaped bodies that extend from airfoil 12. The height of standoffs 34A-34C is greater than the distance between airfoil 12 and baffle 18 to facilitate the ability to cast, or otherwise manufacture, standoffs 34A-34C. For example, the smaller the distance between airfoil 12 and baffle 18, the more difficult it becomes to produce standoffs 34A-34C. Troughs 46A-46C enable the height of standoffs 34A-34C to be increased to levels more easily fabricated, while also enabling the distance between airfoil 12 and baffle 18 to be small such that desired airflow volumes can be achieved.

Figure 3B:
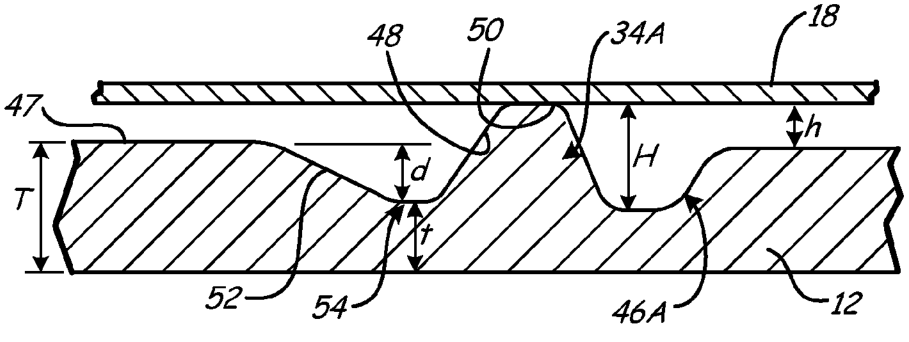
FIG. 3B is an end view of the cross-sectional view of a recessed standoff of FIG. 3A.

FIG. 3B is an end view of the cross-sectional view of standoff 34A and trough 46A of FIG. 3A. Standoff 34A, which extends from interior surface 47 of airfoil 12, includes sidewall 48 and landing 50. Trough 46A includes slope 52 and base 54. Although not drawn to scale, FIG. 3B shows several dimensions of airfoil 12 that illustrate advantages of standoff 34A. Airfoil 12 has a thickness T and standoff 34A has a height H. Base 54 is recessed to depth d in surface 47 to reduce the thickness of airfoil 12 to thickness t. The magnitude of height H is greater than the magnitude of depth d such that baffle 18 is spaced a height h above surface 47. The magnitude of height H is greater than or equal to the minimum feature height that can be detectable by direct measurement. For example, standoff 34A and trough 46A are cast as an integral portion of interior surface 47 of airfoil 12. Due to the roughness of cast surfaces, it is typically only possible to measure features that are 0.010 inches (~0.254 mm) or taller. However, in order to achieve control over airflow between airfoil 12 and baffle 18, it is sometimes desirable to position baffle 18 closer to airfoil 12. For example, height h is maintained to control the volume of cooling air flowing between airfoil 12 and baffle 18. As such, the magnitude of depth d is determined by the minimum measurable feature height of standoff 34A and the desired spacing height h between airfoil 12 and baffle 18. Specifically, the magnitude of depth d is determined by subtracting the desired spacing height h from the minimum measurable feature height H of standoff 34A. The magnitude of depth d is limited in that thickness t cannot fall below a minimum thickness of airfoil 12 such as to unduly compromise the integrity of airfoil 12. Depth d is, however, typically much smaller than thickness T such that integrity of airfoil 12 is not an issue. For example, thickness t is typically maintained at or above 0.015 inches (~0.381 mm).

The shape of standoff 34A is also designed to facilitate manufacturing. For example, it is impossible to machine standoff 34A within airfoil 12 after casting. Thus, the shape of standoff 34A must be completely defined by the casting process. Standoff 34A includes inclined surfaces and rounded edges to facilitate casting. Landing 50, which provides a generally flat surface for engaging baffle 18, transitions to sidewall 48 across a rounded edge. Sidewall 48 declines toward base 54, rather than extending perpendicular to base 54. Standoff 34A thus takes on a trapezoidal profile. Slope 52 of trough 46A inclines toward interior surface 47 rather than extending perpendicular to surface 47. Base 48 transitions between surface 47 and slope 52 across rounded corners. These inclined surfaces enable standoff 34A to be easily removed from a die such that standoff 34A is readily cast as part of airfoil 12. For example, a typical die requires a three degree pull angle. As such, sidewall 48 is offset from being perpendicular to surface 47 by approximately three degrees or more. Additionally, it is sometimes difficult to insert baffle 18 into airfoil 12 due to tolerances. Slope 52 reduces friction between baffle 18 and airfoil 12 to facilitate removal from and insertion into cavity 30 of baffle 18. The rounded edges between surfaces prevent formation of stresses within airfoil 12. Thus, the shape of standoff 34A is selected to facilitate manufacturing of a body that maintains spacing between airfoil 12 and baffle 18. As it were, it is desirable that standoff 34A not interfere with the flow of cooling air between airfoil 12 and baffle 18. Thus, standoff 34A is shown as having a generally cylindrical oval shape that enables cooling air to flow around standoff 34A with minimal disruption. However, the shape of standoff 34A can be designed to advantageously interfere with, or otherwise direct, the flow of cooling air within cooling circuit 38 (FIG. 2).

Figure 4A:
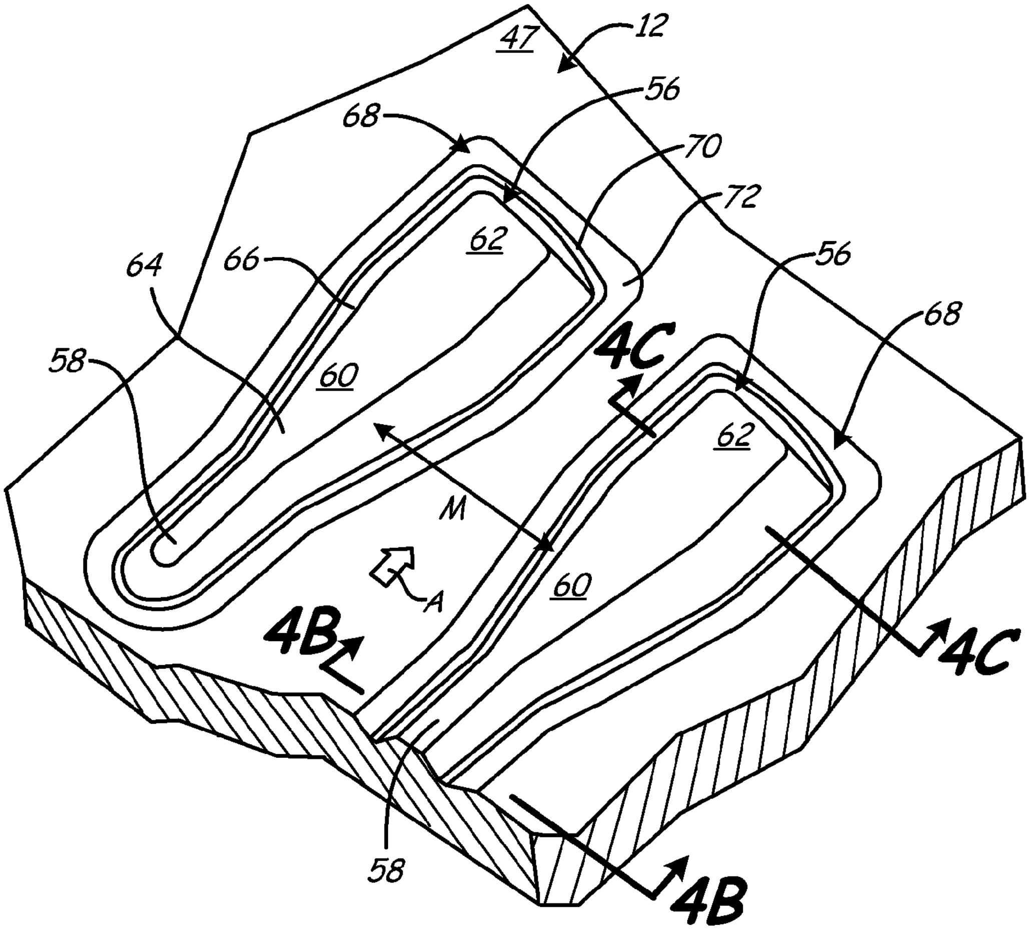
FIG. 4A is a perspective view of recessed metering standoffs used to restrain the cooling baffle within the airfoil of FIG. 1.

FIG. 4A is a perspective view of recessed metering standoffs 56 used to restrain cooling baffle 18 within airfoil 12 of FIG. 1. Metering standoffs 56 include lead sections 58, flare sections 60 and tail sections 62. Each of sections 58-62 includes a portion of landing 64 and sidewall 66. Standoffs 56 are surrounded by troughs 68, each of which includes base 70 and slope 72. Metering standoffs 56 comprise refinements of recessed standoffs 34A-34C of FIGS. 3A and 3B. The height of sidewalls 66 is greater than the depth of troughs 68 such that standoffs 66 can be detected while maintaining spacing between surface 47 and a baffle below the heights of features that can be detected. However, rather than simply comprising oval shapes which seek to minimize influence on cooling air flowing against surface 47, standoffs 56 are shaped to actively influence flow of air against airfoil 12. In particular, each of standoffs 56 is elongated to form a metering channel M between standoffs 56 that can direct flow to hotspots along airfoil 12. Furthermore, the widths and heights of standoffs 56 are adjusted along the length of metering channel M to reduce the cross-sectional area of metering channel M between adjacent standoffs 66.

Figure 5:
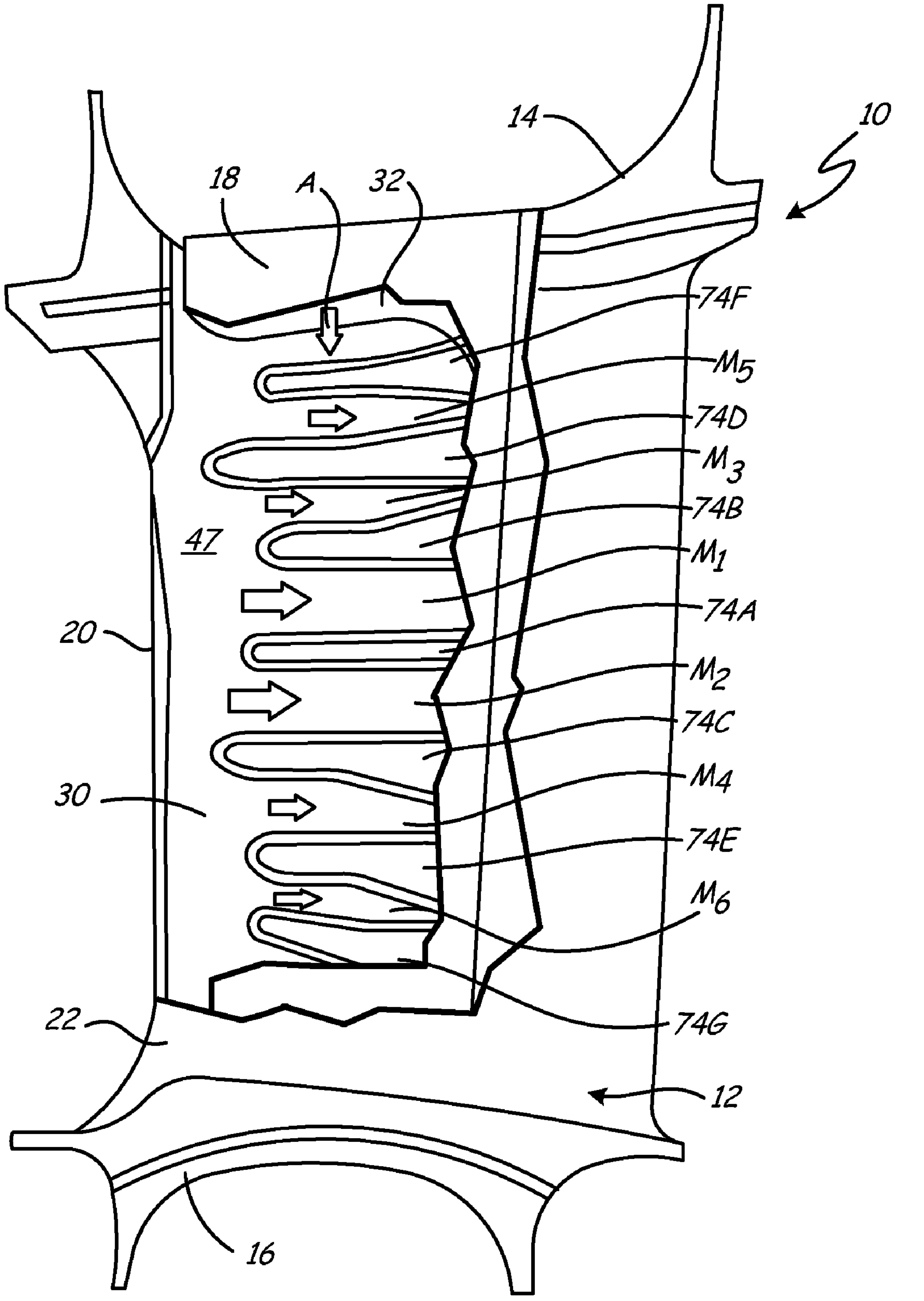
FIG. 5 is a side view of a stationary turbine vane in which an airfoil and a baffle are cut away to show a series of recessed metering standoffs disposed on an interior surface of the airfoil to regulate axial airflow through the vane.

Standoffs 56 comprise lead sections 58, flare sections 60 and tail sections 62. Metering channel M is formed between adjacent standoffs 56. Lead sections 58 comprise elongate sections of generally constant cross-sectional areas. Portions of sidewalls 66 on adjacent lead sections 58 extend in generally parallel directions. Lead sections 58 straighten cooling air A entering metering channel M such that cooling air A travels parallel to the directions in which sidewalls 66 extend. Lead sections 58 are oriented along interior wall 47 to direct cooling air A toward a particular portion of airfoil 12. For example, standoffs 56 can be oriented in an axial direction along airfoil 12 to adjust flow of cooling air A at different positions along the span of vane 10 (as shown in FIG. 5). Lead sections 58 also guide cooling air A into flare sections 60. Flare sections 60 comprise elongate sections of generally increasing cross-sectional areas. Portions of sidewalls 66 on flare sections 60 extend generally obliquely to the direction in which cooling air A flows within channel M. Flare sections 60 form a converging nozzle that chokes flow of cooling air A traveling through metering channel M. As such, the flow of cooling air A is accelerated as the cooling air enters tail sections 62. Tail sections 62 comprise elongate sections of generally constant cross-sectional areas. Portions of sidewalls 66 on flare sections 60 extend generally parallel to the direction in which cooling air A flows within channel M. Tail sections 62 also reduce wear of flare sections 60 providing a trailing edge segment that bears most of the friction from the die used to cast standoffs 56. Thus, standoffs 56 control both flow splitting of cooling air A around baffle 18 and local flow rates of cooling air A along surface 47. Additionally the heights of standoffs 56 can be decreased along the length of standoffs 56 to further reduce the cross-sectional area of metering channel M.

Figure 4B:
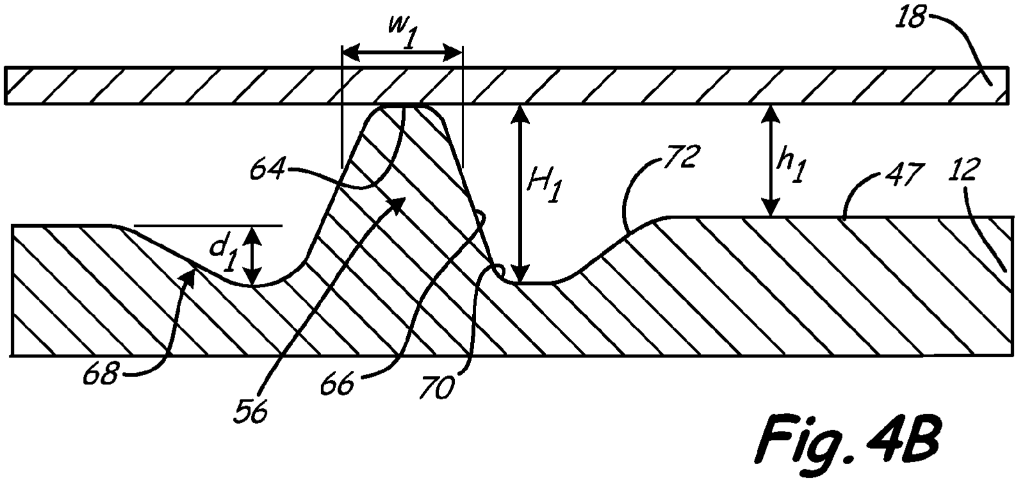
FIG. 4B is a cross-sectional view of a forward portion of a metering standoff of FIG. 4A.
Figure 4C:
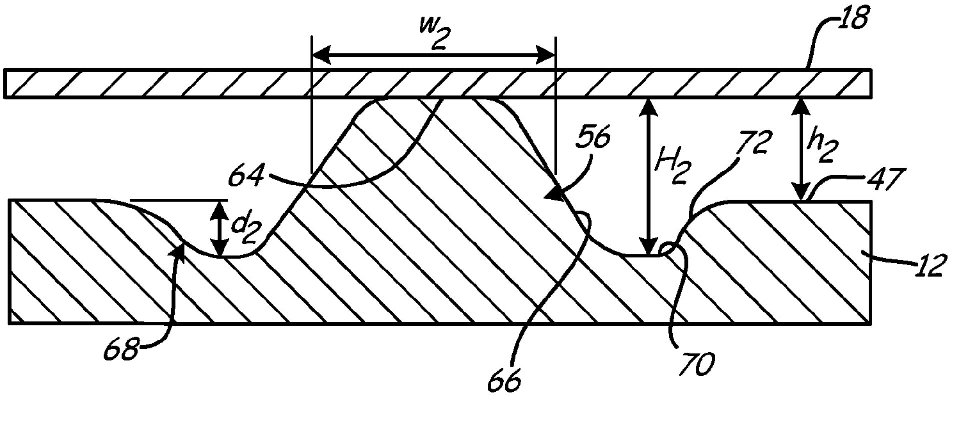
FIG. 4C is a cross-sectional view of an aft portion of a metering standoff of FIG. 4A.

FIG. 4B is a cross-sectional view of lead section 58 of metering standoff 56 of FIG. 4A. FIG. 4C, discussed concurrently with FIG. 4B, is a cross-sectional view of tail section 62 of metering standoff 56 of FIG. 4A. FIGS. 4B and 4C illustrate how standoffs 56 function similarly to that of standoffs 34A-34C of FIGS. 3A and 3B to maintain baffle 18 at a minimum distance from airfoil 12, but also how the widths and heights of standoffs 56 are varied to manipulate flow of cooling air A between adjacent standoffs.

Standoff 56 comprises a pad that extends from interior surface 47 of airfoil 12 to engage baffle 18. Standoff 56 extends across circuit 38 to inhibit movement of baffle 18 within cavity 30 (FIG. 2). Standoff 56 includes landing 64 and sidewall 66, which are surrounded by trough 68 that includes base 70 and slope 72. Landing 64 comprises a generally flat surface against which baffle 18 engages. Sidewall 66 declines from landing 64 toward base 70. Slope 72 inclines toward interior surface 47 of airfoil 12. Transitions between landing 64, sidewall 66, base 70 and slope 72 are rounded. As such, standoffs 56 are readily cast and easily removed from manufacturing dies.

The height of standoff 56 is tapered to constrict the cross-sectional area of metering channel M. The height of standoff 56 changes from height $H_1$ to height $H_2$ between lead section 58 and tail section 62. In one embodiment, height $H_1$ is greater than height $H_2$ such that the distance between baffle 18 and airfoil 12 decreases. As such, height $h_1$ is greater than $h_2$ while depths $d_1$ and $d_2$ remain the same. However, in other embodiments, $H_1$ and $H_2$ can be equal while depths $d_1$ and $d_2$ can be changed to decrease $h_2$ with respect to $h_1$. Thus, baffle 18 is brought closer to surface 47 at tail section 62 as compared to lead section 58 to decrease the volume of cooling air A able to pass through adjacent standoffs 56. In either embodiment, height $H_1$ is greater than height $h_1$ and height $H_2$ is greater than height $h_2$ such that standoff 56 is recessed into and extending beyond surface 47. Heights $H_1$ and $H_2$ are greater than the minimum measurable feature height for a cast object. Standoff 56 is thus readily measurable after casting. In other embodiments, the heights of adjacent standoffs are varied to change the cross-sectional area of metering channel M, rather than varying the height within individual standoffs. For example, standoffs near the outer diameter and inner diameter ends of an airfoil can be shorter than standoffs near the mid-span of the airfoil.

As discussed with reference to FIG. 4A, the width of standoff 56 is also adjusted to constrict the cross-sectional area of metering channel M. The width of standoff 56 increases from $w_1$ at lead section 58 to $w_2$ at tail section 62 at the same height. Lead section 58 and tail section 62 have constant widths across their entire lengths, while flare section 60 has an increasing width across its length to bridge the difference between $w_1$ and $w_2$. Thus, adjacent standoffs 56 form a converging nozzle and the width of metering channel M decreases to reduce the volumetric flow of cooling air. Adjustments in the height and width of standoff 56 can be accomplished while simultaneously adjusting the slope angle of sidewall 66 to obtain the desired cross sectional area of metering channel M. Thus, the cross-sectional area of metering channels between adjacent standoffs can be manipulated to direct different volumes of cooling air A to various positions along airfoil 12.

FIG. 5 is a side view of stationary turbine vane 10 of FIG. 1 in which airfoil 12 and baffle 18 are cut away to show recessed metering standoffs 74A-74G disposed on interior surface 47 of airfoil 12 to regulate axial airflow through vane 10. Standoffs 74A-74G are disposed along suction side 24 (FIG. 1) of airfoil 12 and a corresponding set of standoffs (not shown) are disposed along pressure side 22 of airfoil 12. Airfoil 12 is disposed between outer diameter vane shroud 14 and inner diameter vane shroud 16. Baffle 18 is inserted into internal cavity 30 of airfoil 12. Standoffs 74A-74G maintain spacing between interior surface 47 and baffle 18. Cooling air A is directed radially into supply duct 32 within baffle 18. Cooling holes 28 (FIG. 1) direct cooling air A axially out of baffle 18 and into cavity 30. Metering standoffs 74A-74G form axially extending metering channels $M_1$-$M_6$ that direct various volumes of cooling air through cavity 30, as indicated by the magnitude of arrows in FIG. 5.

Standoffs 74A-74G are arranged to direct different volumes of cooling air A to different positions along the span of airfoil 12. For example, greater volumes of cooling air A can be directed to various hotspots that form along airfoil 12. As discussed above with reference to FIG. 1, the flow dynamics of gas G produced by the geometry of airfoil 12 may result in a particular portion of airfoil 12 developing a hotspot where the temperature rises to levels above where the temperature is at other places along airfoil 12. Thus, it is desirable to deliver additional cooling to those portions of airfoil 12. For the particular configuration of standoffs 74A-74G shown in FIG. 5, a greater volume of cooling air A is delivered to the mid-span of airfoil 12, while the standoffs act to choke flow of cooling air A near the radially outer and inner diameter ends of airfoil 12.

Standoffs 74A-74G are elongated to collimate cooling air A traveling through cavity 30. Elongate metering channels $M_1$-$M_6$ are formed between adjacent standoffs. The width of each standoff is varied to change the cross-sectional area of each metering channel and the volume of cooling air A that passes through the cooling channel. FIG. 5 shows a variety of different standoffs arranged to form a variety of different metering channels. The number and shapes of standoffs can, however, be varied to address different cooling needs and hotspots in various airfoil designs.

Standoff 74A comprises a non-metering elongate standoff having a constant cross sectional area. Thus, standoff 74A is not divided into a lead section, a flare section and a tail section and does not provide metering effects to cooling air A. Standoff 74A does, however, support baffle 18 and collimate cooling air A such that adjacent standoffs can meter cooling air A, if desired.

Standoffs 74B and 74C are positioned adjacent standoff 74A so as to extend generally parallel to standoff 74A. Standoffs 74A and 74B comprise half-metering standoffs that have one non-metering sidewall and an opposing metering sidewall. Thus, standoffs 74B and 74C are divided into lead sections having approximately parallel sidewalls and flare sections having oblique sidewalls. The non-metering sidewalls face standoff 74A to form metering channels $M_1$ and $M_2$. The cross-sectional area of metering channels $M_1$ and $M_2$ do not decrease and the flow of cooling air A is not restricted or choked. Thus, the full volume of cooling air A that passes between lead sections of standoffs 74A-74C exits tail section of standoffs 74A-74C unencumbered and at the same velocity. The metering sidewalls of standoffs 74B and 74C operate in conjunction with adjacent standoffs to restrict flow of cooling air A that passes radially outside of standoff 74B and radially inside of standoff 74C.

Standoff 74D is positioned radially outside of standoff 74B, and standoff 74E is positioned radially inside of standoff 74C to form metering channels $M_3$ and $M_4$. Standoffs 74D and 74E comprise half-metering standoffs, each having a non-metering sidewall and an opposing metering sidewall. Thus, standoffs 74D and 74E are divided into lead sections having generally parallel sidewalls and flare sections having oblique sidewalls. The non-metering sidewalls of standoffs 74D and 74E face the metering sidewalls of standoffs 74B and 74C, respectively. Metering channels $M_3$ and $M_4$ are choked by flare sections of metering standoffs 74B and 74C. Thus, a lower volume of cooling air A is able to pass through metering channels $M_3$ and $M_4$ as compared to metering channels $M_1$ and $M_2$, as indicated by the magnitude of arrows in FIG. 5. The metering sidewalls of standoffs 74D and 74E operate in conjunction with adjacent standoffs to restrict flow of cooling air A that passes radially outside of standoff 74D and radially inside of standoff 74E.

Standoff 74F is positioned radially outside of standoff 74D, and standoff G is positioned radially inside of standoff 74E to form metering channels $M_5$ and $M_6$. Standoffs 74F and 74G comprise full-metering standoffs, each having a first metering sidewall and a second opposing metering sidewall. Thus, standoffs 74F and 74G are divided into lead sections having generally parallel sidewalls and flare sections having oblique sidewalls. The first metering sidewalls of standoffs 74F and 74G face the metering sidewalls of standoffs 74D and 74E, respectively. Metering channel $M_5$ is choked by flare sections of metering standoffs 74D and 74F, and metering channel $M_6$ is choked by flare sections of metering standoffs 74D and 74F. Thus, a lower volume of cooling air A is able to pass through metering channels $M_5$ and $M_6$ as compared to metering channels $M_3$ and $M_4$, as indicated by the magnitude of arrows in FIG. 5. The metering sidewalls of standoffs 74D and 74E operate in conjunction with adjacent standoffs (not shown) to restrict flow of cooling air A that passes outside of standoffs 74F and 74G.

Cooling air A is directed across surface 47 in increasingly smaller volumes at positions radially further from the mid-span of airfoil 12, according to the arrangement of standoffs 74A-74G shown in FIG. 5. Metering channels $M_1$ and $M_2$ direct the greatest volume of cooling air across surface 47 to, for example, cool a hotspot. Metering channels $M_3$ and $M_4$ direct a reduced volume of cooling air A across surface 47 proportional to their distance from the hotspot. Metering channels $M_5$ and $M_6$ direct the smallest volume of cooling air A across surface 47 as they are positioned near shrouds 14 and 16, respectively, where the influences of impingement of hot gas is the least.

The volume of cooling air A provided at each metering channel is controlled using the width of the respective flare sections and the height of the respective standoffs. The distance between adjacent standoffs and the relative height between adjacent standoffs can also be adjusted to influence flow of cooling air A through the various metering channels. Additionally, not all of standoffs 74A-74G need be recessed into surface 47. Although FIG. 5 depicts a specific configuration of standoffs, variously shaped standoffs can be arranged along surface 47 in any number and in any configuration. The standoffs can be oriented along interior surface 47 to direct air in a desired direction. For example, standoffs 74A-74G are oriented along interior surface 47 to direct air in an axial direction. The standoffs, however, can also be oriented to direct cooling air A in a radial direction, or in both axial and radial directions.

Figure 6:
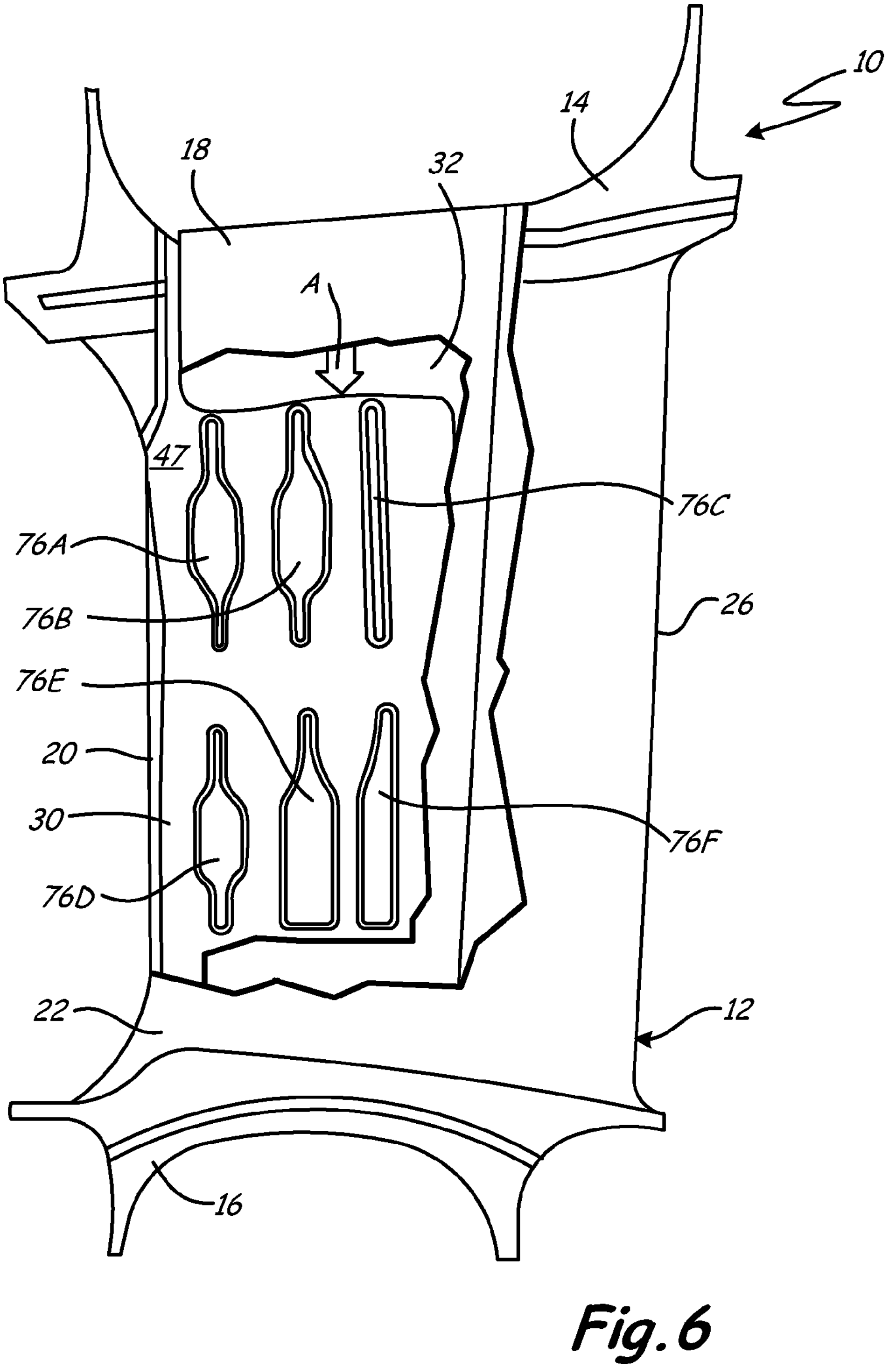
FIG. 6 is a side view of a stationary turbine vane in which an airfoil and a baffle are cut away to show a series of recessed metering standoffs disposed on an interior surface of the airfoil to regulate radial airflow through the vane.

FIG. 6 is a side view of stationary turbine vane 10 of FIG. 1 in which airfoil 12 and baffle 18 are cut away to show recessed metering standoffs 76A-76F disposed on interior surface 47 of airfoil 12 to regulate radial airflow through vane 10. Standoffs 76A-76F are disposed along suction side 24 (FIG. 1) of airfoil 12 and a corresponding set of standoffs (not shown) are disposed along pressure side 22 of airfoil 12. Airfoil 12 is disposed between outer diameter vane shroud 14 and inner diameter vane shroud 16. Baffle 18 is inserted into internal cavity 30 of airfoil 12. Standoffs 76A-76F maintain spacing between interior surface 47 and baffle 18. Cooling air A is directed radially into supply duct 32 within baffle 18. Cooling holes 28 (FIG. 1) direct cooling air A axially out of baffle 18 and into cavity 30. Metering standoffs 76A-76F are elongated in a radial direction to form radially extending metering channels that direct various volumes of cooling air through cavity 30.

Standoffs 76A-76F operate similarly to standoffs 74A-74G of FIG. 5 to cool various portions of surface 47. Standoffs 76A-76F are, however, oriented in a radial direction. As such, rather than directing different volumes of cooling air to different radial positions along the span of airfoil 12, standoffs 76A-76G direct different volumes of cooling air to different axial positions along the chord of airfoil 12. For example, standoffs 76A and 76B form a metering channel that directs cooling air to a radially outer portion of airfoil 12 near leading edge 20. Standoffs 76C and 76B form a metering channel that directs cooling air to a radially outer portion of airfoil 12 closer trailing edge 26. Standoffs 76D and 76E form a metering channel that directs cooling air to a radially inner portion of airfoil 12 near leading edge 20. Standoffs 76F and 76E form a metering channel that directs cooling air to a radially inner portion of airfoil 12 closer to trailing edge 26.

In one embodiment, baffle 18 includes cooling holes similar to that of cooling holes 28 of FIG. 1. In another embodiment, cooling holes are positioned near the outer diameter of baffle 18 such that cooling air A flows down from the cooling holes across standoffs 76A-76F. Cooling air A escaping cooling holes of baffle 18 flows around baffle 18 and in between the rows of standoffs 76A-76F to cool the midspan portion of airfoil 12. Additionally, in other embodiments, cooling air A from cooling holes positioned along the pressure side and suction side of baffle 18 enters standoffs 76A-76F. Within standoffs 76A-76F, cooling air A is divided into metering channels that affects the flow of cooling air A in manners similar as to what is described with respect to FIG. 5. For example, standoff 76C comprises a non-metering standoff having a constant cross sectional area. Standoff 76F comprises a half-metering standoff having a straight sidewall and a metering sidewall. Standoff 76E comprises a full-metering standoff having straight sections and flared sections. Standoffs 76A, 76B and 76D comprise double-metering standoffs having a straight lead section, a converging flare section, a diverging flare section and a straight tail section.

A converging metering channel is formed between standoffs 76E and 76F, and converging-diverging metering channels are formed between standoffs 76C and 76B; 76B and 76A; and 76D and 76E, respectively. The converging flare sections accelerate cooling air A, while the diverging sections decelerate cooling air A. The shapes and features of elongated standoffs 76A-76E can be adjusted to achieve any desirable airflow against airfoil 12. For example, the width of the flared sections, and the height of standoffs 76A-76E can be adjusted. Also, standoffs 76A-76E can be arranged in any desirable array to direct flow split around baffle 18 within cavity 30.

Figure 7:
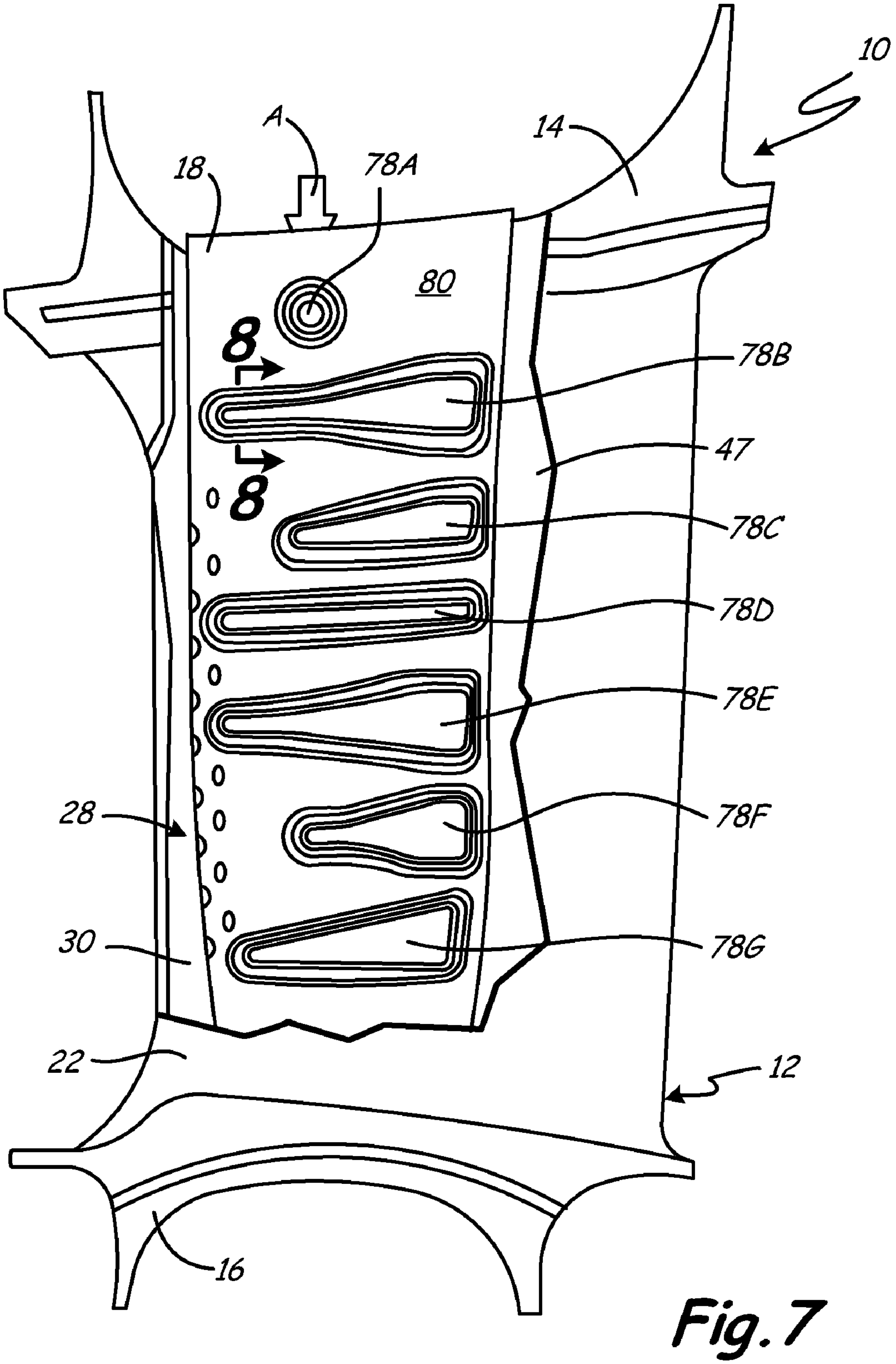
FIG. 7 is a side view of a stationary turbine vane in which an airfoil is cut away to show a series of recessed metering standoffs disposed on an exterior surface of a baffle to regulate axial airflow through the vane.

FIG. 7 is a side view of stationary turbine vane 10 of FIG. 1 in which airfoil 12 is cut away to show recessed metering standoffs 78A-78G disposed on exterior surface 80 of baffle 18 to regulate axial airflow through vane 10. Standoffs 78A-78G are disposed along the suction side of baffle 18 and a corresponding set of standoffs (not shown) are disposed along the pressure side of baffle 18. Airfoil 12 is disposed between outer diameter vane shroud 14 and inner diameter vane shroud 16. Baffle 18 is inserted into internal cavity 30 of airfoil 12. Standoffs 78A-78G maintain spacing between interior surface 47 and exterior surface 80 of baffle 18. Cooling air A is directed radially into baffle 18. Cooling holes 28 direct cooling air A axially out of baffle 18 and into cavity 30.

Standoffs 78A-78G are elongated to collimate cooling air A in a specific orientation with respect to the radial and axial directions of airfoil 12. Metering standoffs 78A-78G are elongated in an axial direction to form axially extending metering channels that direct various volumes of cooling air A through cavity 30. In other embodiments, however, standoffs 78A-78G can be oriented along exterior surface 80 in other directions, such as radially, similar as to what is shown and described with respect to FIG. 6. Thus, standoffs 78A-78G control flow splitting of cooling air A around baffle 18.

The geometries of standoffs 78A-78G are also shaped to direct different volumes of cooling air A between adjacent standoffs, similar as to what is shown and described with respect to FIGS. 5 and 6. Specifically, the absolute and relative heights of standoffs 78A-78G can be adjusted to vary the volumetric flow rate of cooling air A. Also, the width of flare sections of standoffs 78A-78G can be adjusted to accelerate or decelerate cooling air A between standoffs.

Thus, standoffs 78A-78G perform similar functions as to standoffs 34A-34C, standoffs 36A-36C, standoffs 56, standoffs 74A-74G and standoffs 76A-76F. However, rather than being integrally cast as part of baffle 18, standoffs 78A-78G are formed into baffle 18.

Figure 8:
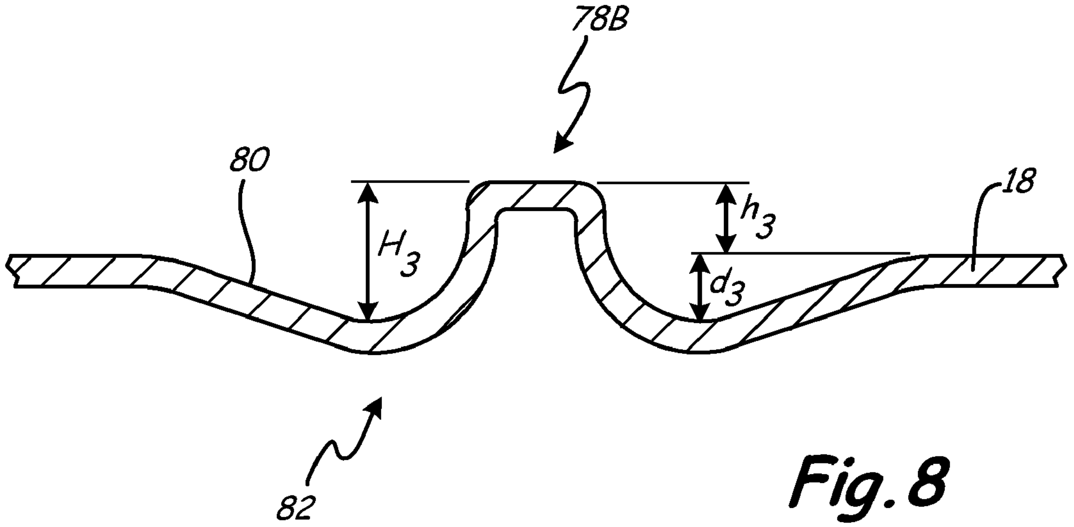
FIG. 8 is a cross-sectional view of the baffle of FIG. 7 showing a recessed standoff.

FIG. 8 is a cross-sectional view of baffle 18 taken at section 8-8 of FIG. 7 showing recessed standoff 78B extending from exterior surface 80. Standoff 78B is surrounded by trough 82. Similar as to what is described with reference to FIG. 3B and FIGS. 4B and 4C, standoff 78B is recessed into exterior surface 80. Although not drawn to scale, standoff 78B has a height $H_3$ and is recessed to a depth $d_3$. Height $H_3$ is greater than depth $d_3$ such that standoff 78B extends a height $h_3$ above surface 80. As such, surface 47 of airfoil 12 (FIG. 3A) is spaced a distance equal to height $h_3$ from surface 80 of baffle 18. The magnitude of height $H_3$ is greater than or equal to the minimum feature height that can be detectable by direct measurement for a die-shaping process.

Standoff 78B is shaped to have height $H_3$ and to be recessed to depth $d_3$ in surface 80 by forming bends in baffle 18 during a manufacturing process. Baffle 18 is typically formed from thin sheet metal. First, a pattern is cut from a piece of flat sheet metal. Next, the pattern is bent and welded to form a rough-shaped hollow body. The shape of the hollow body is then finished using a series of die-shaping steps which give the hollow body the general shape of an airfoil. In one embodiment, standoffs 78A-78G are formed into the sheet metal using the die-shaping steps. Thus, standoffs 78A-78G are basically stamped into baffle 18 such that the thickness of baffle 18 does not substantially change during the fabrication of standoffs 78A-78G. The top and bottom of the hollow, airfoil-shaped structure can then be trimmed to give baffle 18 the desired height for use with a specific vane. Plates can then be welded to each end to facilitate connection with shrouds 14 and 16. Finally, cooling holes 28 are produced in baffle 18 using any conventional method.

The magnitude of depth $d_3$ is determined by the minimum measurable feature height of standoff 78B, and the spacing height $h_3$ between airfoil 12 and baffle 18 desired to control airflow. Typically, the magnitude of depth $d_3$ is determined by subtracting the desired spacing height $h_3$ from the minimum measurable feature height $H_3$ of standoff 78B. As such, standoff 78B is made having height $H_3$ that is readily manufactured with a die-shaping process and thereafter readily detected. Trough 82 is recessed to a depth d3 such that baffle 18 can be brought into a desired proximity of airfoil 12 that is less than height $H_3$ to control the volumetric airflow between airfoil 12 and baffle 18.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An internally cooled airfoil comprising:

an airfoil body shaped to form a leading edge, a trailing edge, a pressure side and a suction side surrounding an internal cooling channel; and first and second elongate standoffs extending along an interior surface within the cooling channel and configured to maintain a spacing between an exterior surface of a baffle and the interior surface of the airfoil body;

wherein the elongate standoffs are shaped to meter and accelerate airflow between the interior surface of the airfoil body and the exterior surface of the baffle; and wherein the first and second elongate standoffs form a channel having a decreasing cross-sectional area in a direction in which the airflow travels.

2. The internally cooled airfoil of claim 1 wherein at least one of the first and second elongate standoffs has an increasing width in a direction in which the airflow travels.

3. The internally cooled airfoil of claim 1 wherein the first and second elongate standoffs have decreasing heights in a direction in which the airflow travels.

4. The internally cooled airfoil of claim 1 wherein a height of the first elongate standoff is different than a height of the second elongate standoff.

5. The internally cooled airfoil of claim 1 wherein walls of the first and second elongate standoffs are sloped to shape a trapezoidal cross-sectional profile.

6. The internally cooled airfoil of claim 5 wherein at least one of the first and second elongate standoffs comprise:

a lead section having sides extending parallel to an axial direction; and a flare section having at least one side extending from the lead section obliquely to the axial direction.

7. The internally cooled airfoil of claim 6 wherein the at least one of the first and second elongate standoffs further comprises a tail section having sides extending from the flare section parallel to the axial direction.

8. The internally cooled airfoil of claim 1 wherein the first and second elongate standoffs are recessed into the interior surface such that a height of the standoffs is greater than the spacing between the exterior surface of the baffle and the interior surface of the airfoil body.

9. The internally cooled airfoil of claim 1 and further comprising additional elongate standoffs with different metering effects.

10. The internally cooled airfoil of claim 9 wherein the different metering effects direct a higher volume of airflow to a hotspot along the interior surface.

11. The internally cooled airfoil of claim 10 wherein the first and second elongate standoffs extend along the interior surface in a radial direction extending from an inner diameter end to an outer diameter end of the airfoil body.

12. The internally cooled airfoil of claim 10 wherein the first and second elongate standoffs extend along the interior surface in an axial direction extending from the leading edge toward the trailing edge.

13. A internally cooled airfoil comprising:

an airfoil body shaped to form a leading edge, a trailing edge, a pressure side and a suction side surrounding an internal cooling channel;

a hollow liner body having a first end and a second end, the liner body disposed within the internal cooling channel;

a plurality of cooling holes extending through the hollow liner body to direct cooling air out of the baffle insert; and first and second elongate standoffs extending along an interior surface of the internal cooling channel and configured to maintain a spacing between an exterior surface of the hollow liner body and the interior surface of the internal cooling channel;

wherein the elongate standoffs are shaped to meter airflow between the exterior surface of the hollow liner body and the interior surface of the internal cooling channel; and wherein the first and second elongate standoffs are recessed into the interior surface such that a height of the standoffs is greater than the spacing.

14. The internally cooled airfoil of claim 13 wherein the first and second elongate standoffs form a channel having a decreasing cross-sectional area in a direction in which the airflow travels.

15. The baffle insert of claim 13 wherein at least one of the first and second elongate standoffs comprises:

a lead section having sides extending parallel to an axial direction; and a flare section having at least one side extending from the lead section obliquely to the axial direction; and a tail section having sides extending from the flare section parallel to the axial direction;

wherein walls of the first and second elongate standoffs are sloped to shape a trapezoidal cross-sectional profile.

16. The internally cooled airfoil of claim 13 and further comprising additional elongate standoffs with different metering effects, wherein the different metering effects direct a higher volume of airflow to a hotspot along the interior surface of the airfoil.

17. An internally cooled airfoil comprising:

an airfoil body shaped to form a leading edge, a trailing edge, a pressure side and a suction side surrounding an internal cooling channel;

a baffle insert disposed within the internal cooling channel, the baffle insert comprising:

a hollow liner body having a perimeter shaped to correspond to the shape of the internal cooling channel and to form a cooling air supply duct; and a plurality of cooling holes extending through the hollow liner body to direct cooling air from the supply duct into the internal cooling channel; and first and second elongate standoffs positioned between the airfoil body and the liner body to maintain a spacing between the airfoil body and the liner body;

wherein the elongate standoffs are shaped to meter and accelerate airflow between the airfoil body and the liner body; and wherein the first and second elongate standoffs form a channel having a decreasing cross-sectional area in a direction in which the airflow travels.

18. The internally cooled airfoil of claim 17 wherein at least one of the first and second elongate standoffs has an increasing width in a direction in which the airflow travels.

19. The internally cooled airfoil of claim 17 wherein the first and second elongate standoffs have decreasing heights in a direction in which the airflow travels.

20. An internally cooled airfoil comprising:

an airfoil body shaped to form a leading edge, a trailing edge, a pressure side and a suction side surrounding an internal cooling channel; and first and second elongate standoffs extending along an interior surface within the cooling channel and configured to maintain a spacing between an exterior surface of a baffle and the interior surface of the airfoil body;

wherein the elongate standoffs are shaped to meter airflow between the interior surface of the airfoil body and the exterior surface of the baffle; and wherein walls of the first and second elongate standoffs are sloped to shape a trapezoidal cross-sectional profile.

21. The internally cooled airfoil of claim 20 wherein at least one of the first and second elongate standoffs comprise:

a lead section having sides extending parallel to an axial direction; and a flare section having at least one side extending from the lead section obliquely to the axial direction.

22. The internally cooled airfoil of claim 21 wherein the at least one of the first and second elongate standoffs further comprises a tail section having sides extending from the flare section parallel to the axial direction.

23. The internally cooled airfoil of claim 20 wherein the first and second elongate standoffs are recessed into the interior surface such that a height of the standoffs is greater than the spacing between the exterior surface of the baffle and the interior surface of the airfoil body.

24. An internally cooled airfoil comprising:

an airfoil body shaped to form a leading edge, a trailing edge, a pressure side and a suction side surrounding an internal cooling channel; and first and second elongate standoffs extending along an interior surface within the cooling channel and configured to maintain a spacing between an exterior surface of a baffle and the interior surface of the airfoil body;

wherein the elongate standoffs are shaped to meter airflow between the interior surface of the airfoil body and the exterior surface of the baffle;

and further comprising additional elongate standoffs with different metering effects.

25. The internally cooled airfoil of claim 24 wherein the different metering effects direct a higher volume of airflow to a hotspot along the interior surface.

26. The internally cooled airfoil of claim 25 wherein the first and second elongate standoffs extend along the interior surface in a radial direction extending from an inner diameter end to an outer diameter end of the airfoil body.

27. The internally cooled airfoil of claim 25 wherein the first and second elongate standoffs extend along the interior surface in an axial direction extending from the leading edge toward the trailing edge.

28. The internally cooled airfoil of claim 24 wherein walls of the first and second elongate standoffs are sloped to shape a trapezoidal cross-sectional profile.

29. The internally cooled airfoil of claim 24 wherein at least one of the first and second elongate standoffs comprise:

a lead section having sides extending parallel to an axial direction; and a flare section having at least one side extending from the lead section obliquely to the axial direction.

30. The internally cooled airfoil of claim 29 wherein the at least one of the first and second elongate standoffs further comprises a tail section having sides extending from the flare section parallel to the axial direction.

31. An internally cooled airfoil comprising:

an airfoil body shaped to form a leading edge, a trailing edge, a pressure side and a suction side surrounding an internal cooling channel; and first and second elongate standoffs extending along an interior surface within the cooling channel and configured to maintain a spacing between an exterior surface of a baffle and the interior surface of the airfoil body;

wherein the elongate standoffs are shaped to meter and accelerate airflow between the interior surface of the airfoil body and the exterior surface of the baffle; and wherein a height of the first elongate standoff is different than a height of the second elongate standoff.

32. The internally cooled airfoil of claim 31 wherein the first and second elongate standoffs form a channel having a decreasing cross-sectional area in a direction in which the airflow travels.

33. The internally cooled airfoil of claim 32 wherein at least one of the first and second elongate standoffs has an increasing width in a direction in which the airflow travels.

34. The internally cooled airfoil of claim 32 wherein the first and second elongate standoffs have decreasing heights in a direction in which the airflow travels.

35. The internally cooled airfoil of claim 31 wherein walls of the first and second elongate standoffs are sloped to shape a trapezoidal cross-sectional profile.

36. The internally cooled airfoil of claim 31 wherein at least one of the first and second elongate standoffs comprise:

a lead section having sides extending parallel to an axial direction; and a flare section having at least one side extending from the lead section obliquely to the axial direction.

37. The internally cooled airfoil of claim 36 wherein the at least one of the first and second elongate standoffs further comprises a tail section having sides extending from the flare section parallel to the axial direction.

* * * * *